Nov. 30, 1937.  W. L. MORRISON  2,100,406
AIR DEFLECTING DEVICE FOR AUTOMOBILES
Original Filed May 16, 1934  5 Sheets-Sheet 1
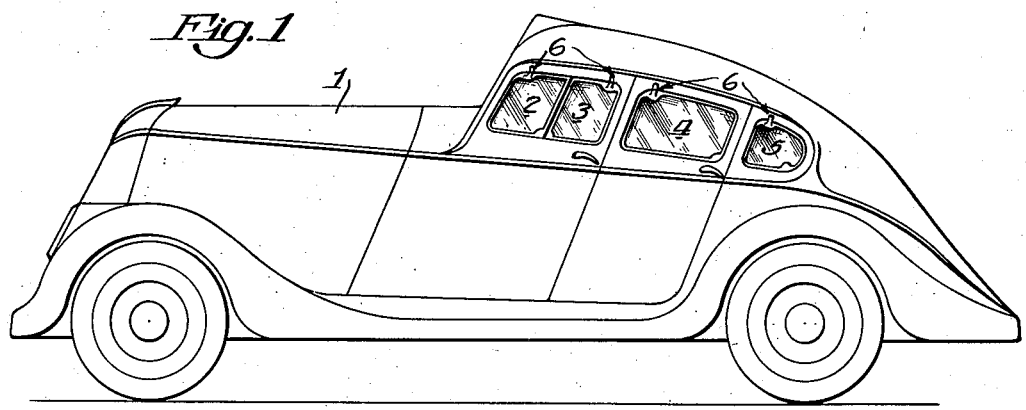
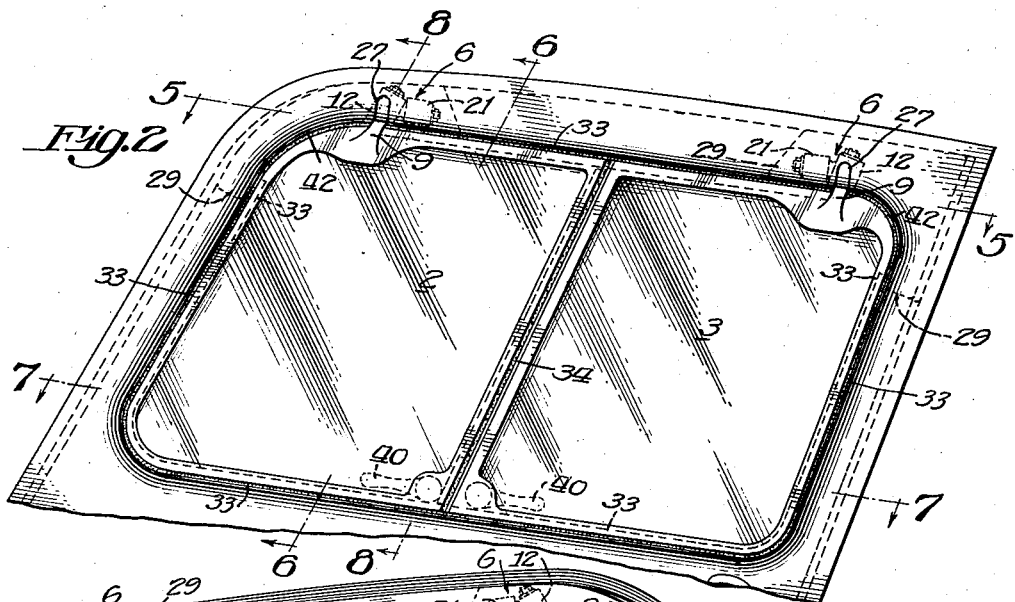
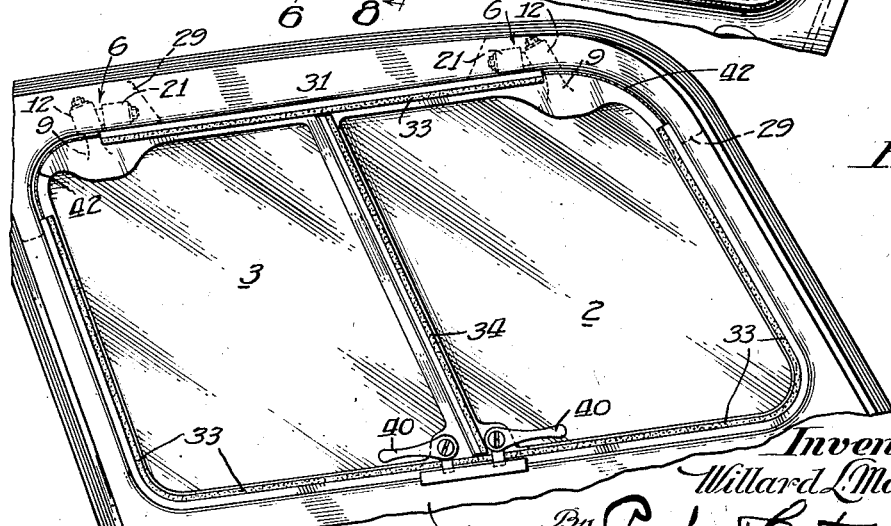
Inventor:
Willard L. Morrison
By Parker & Carter Attys.

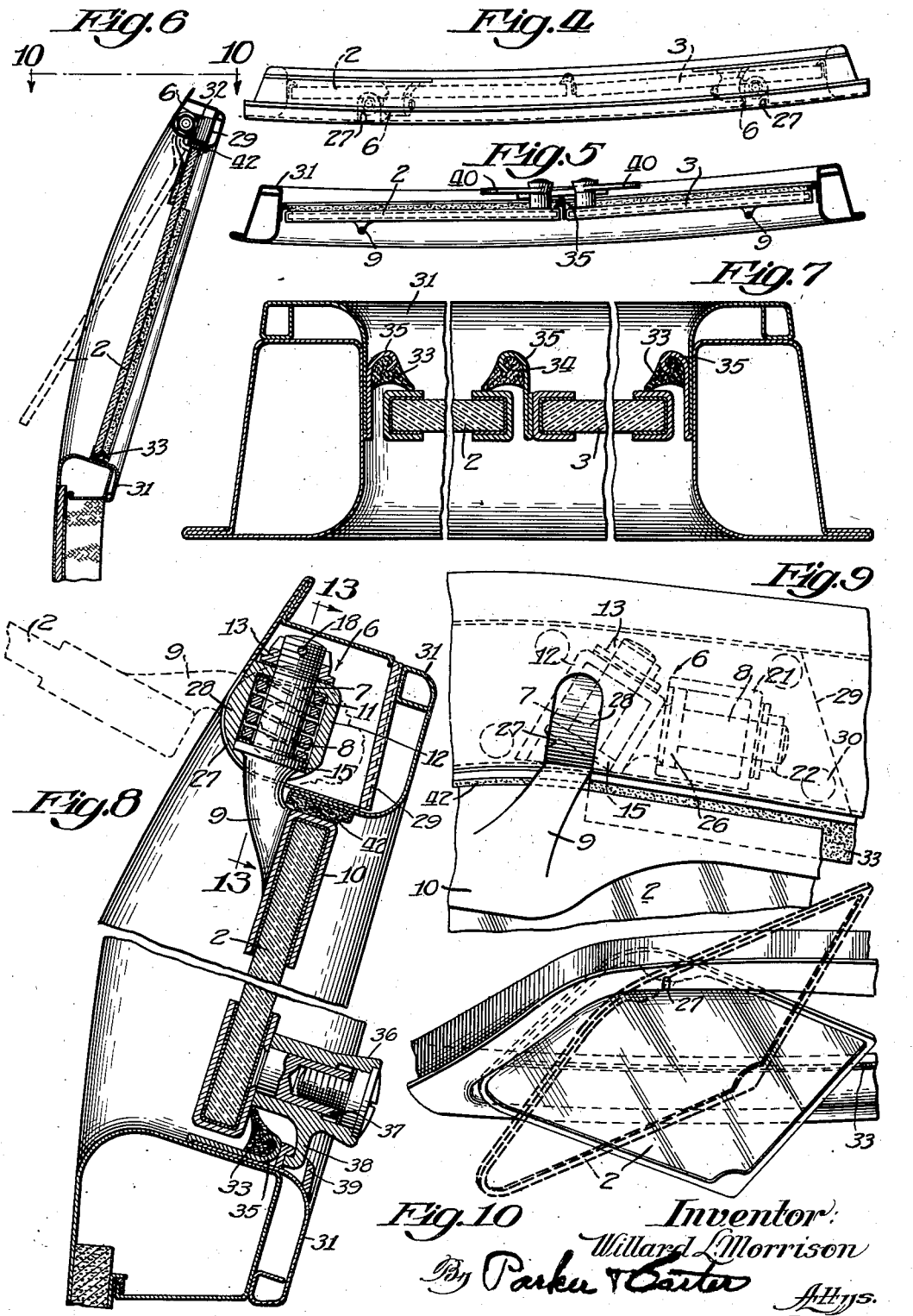

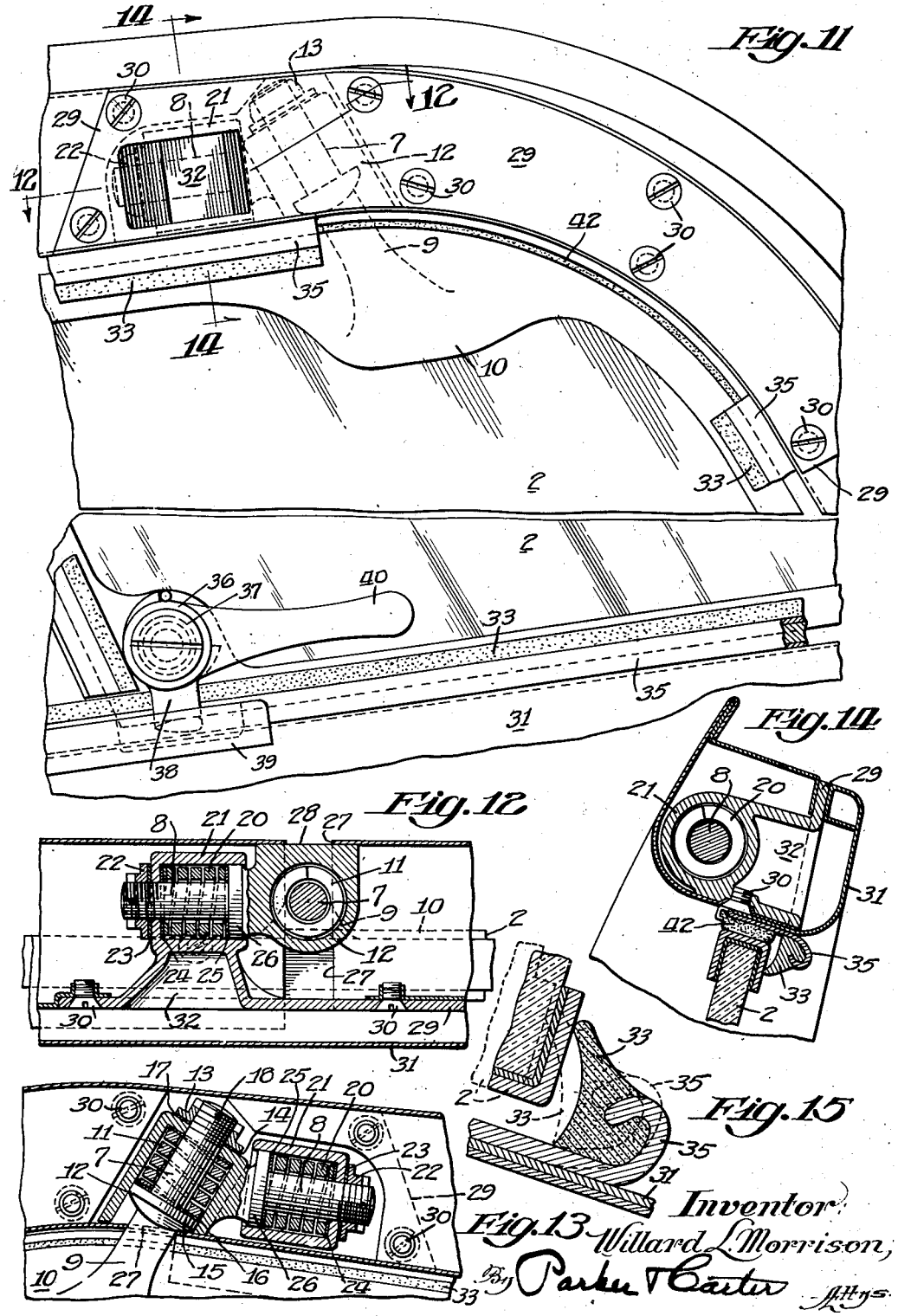

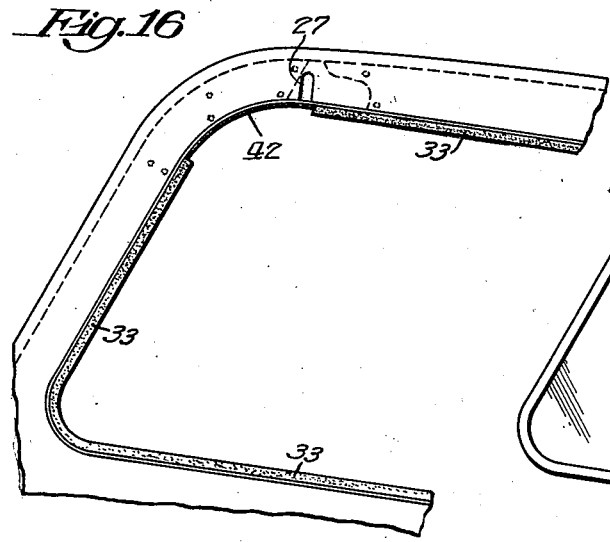
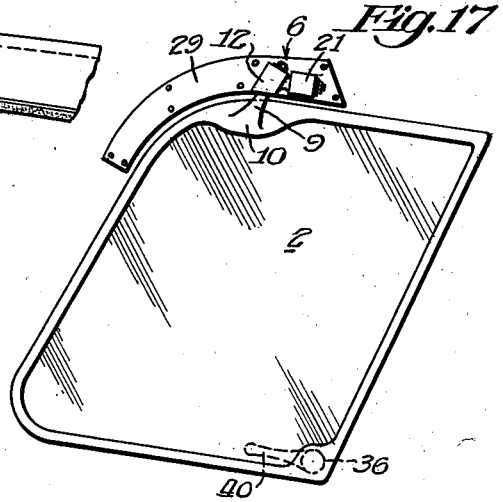
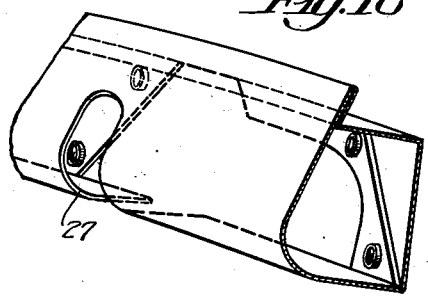
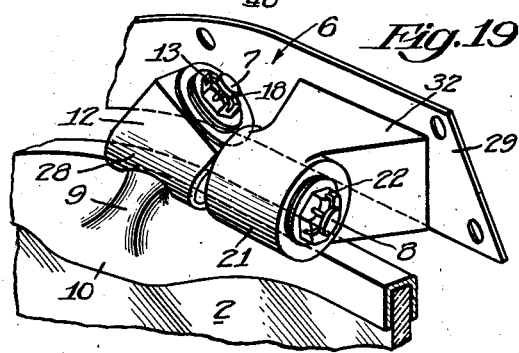
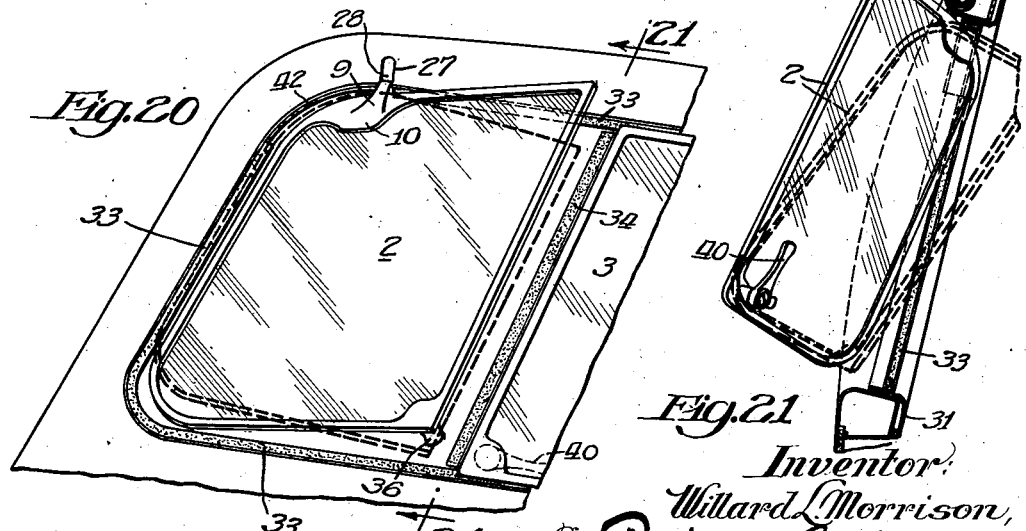

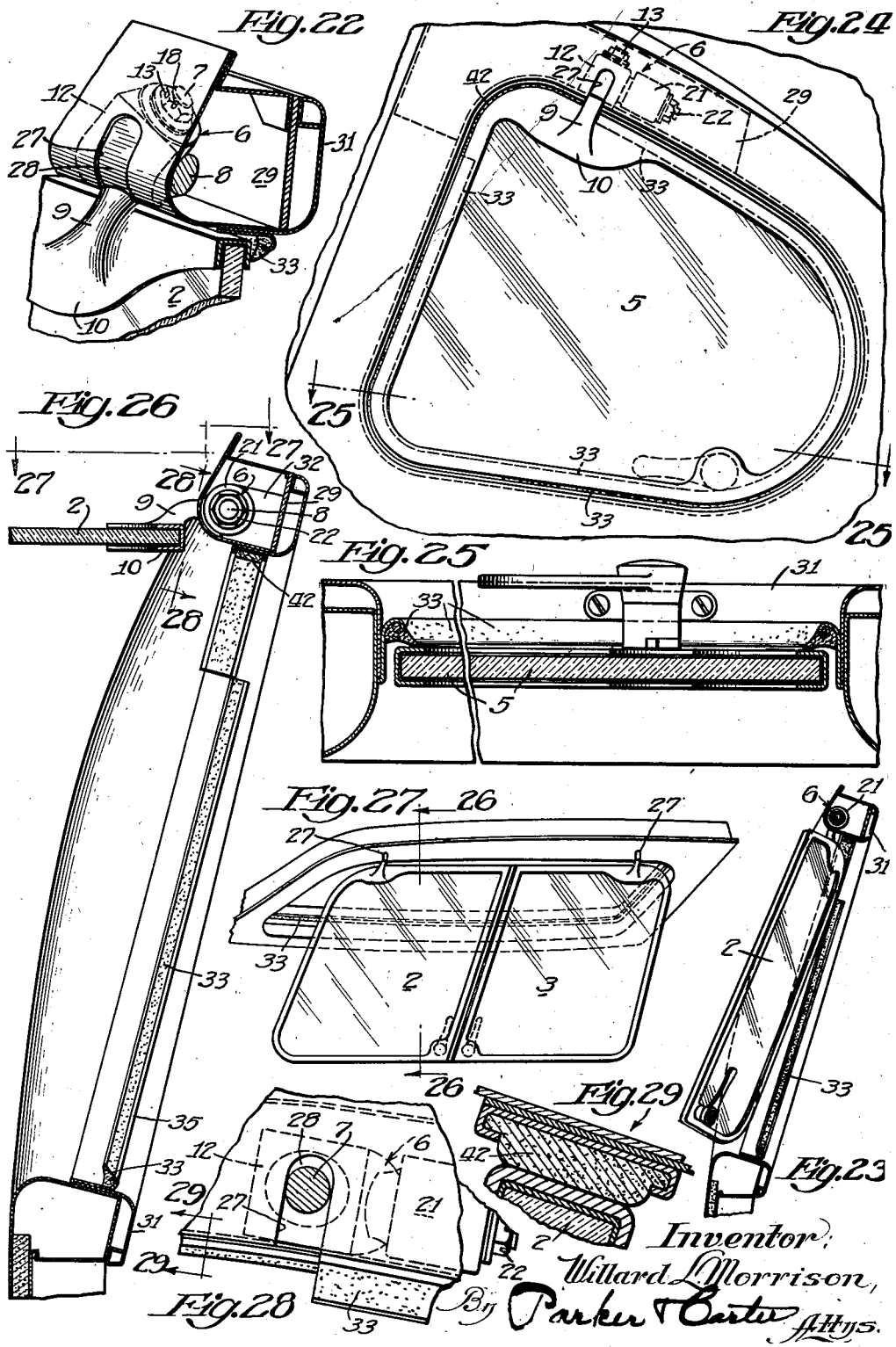

Patented Nov. 30, 1937

2,100,406

UNITED STATES PATENT OFFICE 2,100,406

AIR DEFLECTING DEVICE FOR AUTOMOBILES

Willard L. Morrison, Lake Forest, Ill.

Application May 16, 1934, Serial No. 725,842
Renewed April 8, 1936

14 Claims. (Cl. 296—44)

This invention relates to air deflecting devices for automobiles for ventilating such automobiles and has for its object to provide a new and improved device of this description. The invention has as a further object to provide a deflecting device for automobiles wherein there is a ventilating section or window which may be moved to various ventilating positions and may be moved to secure a fully open window. The invention has as a further object to provide a ventilating device wherein there is a window pivoted at all times in position, the window being pivoted between its front and rear edges, but which can be moved to all its various ventilating positions, and wherein the sealing device which engages the face of the window is all on one side of the window, being on the inside of the window. The invention has as a further object to provide a ventilating device for automobiles wherein there is a window pivoted at all times in position, but which can be moved to secure a fully open window opening.

With pivoted ventilating windows as heretofore used, which are pivoted intermediate their front and rear edges, such windows when moved to certain positions to permit air to enter at the front edge, has the front edge projecting into the automobile so that when it rains, water striking the window runs down from this front edge into the automobile and on to the occupants. The present invention has as one of its objects to provide a pivoted ventilating window wherein this objectionable feature is entirely obviated.

The invention has as a further object to provide a ventilating window section pivoted between its front and rear edges, arranged so that the bottom part thereof can be moved outwardly to various distances from the window reveal and the window can still be moved to any desired angular position while the lower part is thus out away from the reveal. The invention has as a further object to provide a ventilating device for automobiles wherein there is a pivoted window pivoted between its front and rear edges so as to pivoted about an up and down axis, the lower end of said axis being movable outwardly to various distances from the reveal of the window. The invention has as a further object to provide such a ventilating window section wherein the lower end of the vertical axis of rotation is wholly disconnected from the reveal. The invention has as a further object to provide a ventilating device for automobiles wherein there is a ventilating window section pivoted between its front and rear edges and arranged so that substantially all of the air engaging surface may be moved outside of the reveal so that it may be substantially all used as an air deflecting surface. The invention has as a further object to provide a ventilating device for automobiles wherein the lower edge of the section can be moved outwardly to any desired position and the deflector section, while the lower end is moved out, can be moved to any angular position so as to get any ventilating effects desired. The invention has as a further object to provide a ventilating window section for automobiles pivoted between its front and rear edges and arranged so that when it is moved to an angular position it can then be moved to vary the length of the opening at the front lengthwise of the car. In other words, the window section can be moved to any desired ventilating angle and at the same time the opening in front of it into the car may be varied.

In rainy weather or cold weather moisture deposits on the inside of the wind shield of the automobile so that it is difficult for the driver to see through it. This invention has as one of its objects to provide a ventilating device wherein the ventilating window section can be moved to such a position as to direct a current of air across the inside of the wind shield to remove this deposit of moisture thereon and with the bottom of the glass projecting into the automobile, thereby securing this effect without permitting rain to enter the automobile.

In the ventilating devices heretofore used, having a pivoted window section pivoted between its front and rear edge, it was necessary to have part of the sealing material on one side of the window section and the other part on the other side, and this makes an expensive moulded sealing device. The present invention has as one of its objects to provide such a window pivoted between its front and rear edges wherein the sealing device is all on the same side, being on the inside of the window section, and thus be made of the cheapest rubber, such for example as extruded rubber, thereby greatly cheapening the construction.

The invention has as a further object to provide a ventilating window having a sealing device which, when in position, may be easily and quickly adjusted to move the sealing engaging part toward or away from the window to compensate for any inaccuracies due to aging or improper workmanship or the like. The invention has other objects which are more particularly pointed out in the accompanying description.

Referring now to the drawings, Fig. 1 is a view showing an automobile with a ventilating device embodying the invention;

Fig. 2 is an enlarged exterior view of the ventilating device;

Fig. 3 is an enlarged interior view of the ventilating device;

Fig. 4 is a top view of Fig. 2;

Fig. 5 is a sectional view taken on line 5—5 of Fig. 2;

Fig. 6 is a sectional view taken on line 6—6 of Fig. 2;

Fig. 7 is an enlarged sectional view with parts omitted taken on line 7—7 of Fig. 2 showing one form of sealing device;

Fig. 8 is an enlarged sectional view with parts omitted taken on line 8—8 of Fig. 2;

Fig. 9 is an enlarged portion of one of the pivot costructions of one of the window sections;

Fig. 10 is a view as seen from line 10—10 of Fig. 6 showing the window section in various angular positions;

Fig. 11 is an enlarged view with parts omitted of the right hand end of Fig. 3;

Fig. 12 is a sectional view taken on line 12—12 of Fig. 11;

Fig. 13 is a sectional view taken on line 13—13 of Fig. 8;

Fig. 14 is a sectional view taken on line 14—14 of Fig. 11;

Fig. 15 is an enlarged view showing the lower sealing portion illustrated in Fig. 8;

Fig. 16 is a view similar to the front portion of Fig. 2 with the window section removed showing the seal;

Fig. 17 is the window section that has been removed from Fig. 16;

Fig. 18 is an enlarged perspective view of the window frame at the point where the pivots are connected therewith;

Fig. 19 is an enlarged perspective view of the pivotal construction itself shown in Fig. 17;

Fig. 20 is a view of the front window section as shown in Fig. 2 with the window section in the positions shown in Fig. 10;

Fig. 21 is a sectional view taken on line 21—21 of Fig. 20;

Fig. 22 is a perspective view showing the connection between the top of the window section and the pivot which is shown in Fig. 9;

Fig. 23 is a view similar to Fig. 6 showing the window section with the bottom moved outwardly and the rear end moved outwardly and the forward end in contact with the seal;

Fig. 24 is a view showing the invention applied to the rear quarter window of an automobile;

Fig. 25 is a sectional view taken on line 25—25 of Fig. 24;

Fig. 26 is an enlarged view showing the window section in a substantially horizontal position and also showing the sealing device;

Fig. 27 is a view looking down on Fig. 26 on the line 27—27;

Fig. 28 is a sectional view taken on line 28—28 of Fig. 26;

Fig. 29 is a sectional view taken on line 29—29 of Fig. 28.

Like numerals refer to like parts throughout the several figures.

Referring now to the drawings, I have illustrated an automobile 1 provided with one form of ventilating device embodying the invention. It is of course evident that a single ventilating window section may be used either at the front or the rear or for the rear quarter window, or that two window sections may be used in the window opening and I do not wish to be limited by the drawings in this particular.

In the construction shown in Fig. 1 I have shown the ventilating device consisting of the two window sections 2 and 3 at the front and the single window section 4 at the rear door. There is also a rear quarter window section 5 which is similar, for example, to the front window section 2. All of these window sections may be similar and are pivotally connected in position in a similar manner by a pivotal construction which I have designated generally by the numeral 6. Since all of the pivotal constructions will be similar, I have described in detail only one of them, as this description will apply to all of them, and I have taken for the purpose of description the front window section 2.

This window section is pivoted between its front and rear edges and is pivoted in such a manner that the lower edge may be moved outwardly and that the window section may be moved about its pivotal connection while this lower edge is moved outwardly to any desired position, even where the window section is horizontal, making the entire glass usable, not only as a ventilating construction, but as a shield to shed the rain, and still have a full open window. The pivotal connection of the window section is at the top and it may be of various forms. It may be stated to be a more or less universal pivotal connection. A complete universal connection might be used, but it has certain disadvantages, and that is if you have two window sections they may crash or be brought into contact with each other. I therefore prefer to use a pivotal connection which shall be free of these defects and which shall prevent the two window sections, when used, from striking each other, whatever may be the positions into which they are moved. Such a pivotal connection that will give the desired results is illustrated in the drawings and consists of two pivots 7 and 8 at an angle to each other.

The pivot 7 is connected to the top of the window section in any desired manner. I have shown as a preferred construction a pivot 8 which is off set, as it were, being at one side of the plane of the window section when closed. This pivot, in the construction shown, is connected by a member 9 with a member 10 attached to the top of the window section, and is connected with the window section intermediate its front and rear edges. This pivot permits the window section to be moved to various angular positions and is provided with some suitable means by means of which the window section may be held in any angular position to which it is moved, and will not be accidentally moved and will not be moved by the pressure striking the window.

Any suitable means for this purpose may be used and I have illustrated the friction device which consists of a coil spring 11 which surrounds the pivot 7 and which is enclosed within a case 12. The end of the pivot 7 projects through an opening in the case 12 and is preferably connected by a screwthread to a nut 13 which rests on top of the case 12, there being a friction washer 14 between the nut and the casing. The pivot has an annulus or shoulder 15 below the spring, there being a friction washer 16 between this shoulder and the spring. There is also a friction washer 17 between the upper end of the spring and the case 12. It will be seen that by screwing down the nut 13 the spring 11 may be compressed to the desired amount to secure the desired friction. If desired, then a pin 18 may be passed through the nut or an extra washer 19 and the pivot so as to hold the parts in proper position and prevent the nut from being loosened by vibration so that when the device is once tightened up, no more attention need be given to it. The shoulder 15 is made large enough to tightly fit in the case 12 so that there will be no lateral movement of the parts, thus preventing any rattling.

The case 12 has connected with it the pivot 8. This pivot being at an angle to the pivot 7 so that the pivot 7 and the glass may be moved to different angular positions, this movement causing the pivot 8 to move. This pivot 8 is also preferably arranged so that the parts will stay in any position to which they are moved, and I have illustrated a similar friction device for securing this result, consisting of the spring 20 in the case 21, the spring surrounding the pivot. The end of the pivot projects through an opening in the case and is screwthreaded into a nut 22 which bears against the top of the case. In this case there are also the three friction washers 23, 24 and 25, the parts being arranged so that when the nut is tightened up the spring will be compressed to secure the desired friction, the spring being compressed between the end of the casing and the shoulder 26 on the pivot. This pivot 8 permits the lower edge of the window section to be moved outwardly away from the reveal to any desired position, even to a horizontal position, at the top of the window opening, or even to a higher position if desired.

It will be seen that when the bottom of the window section is moved outwardly, the entire window section is moved and the part 9 which connects the window section with the pivot 7, moves upwardly and there is a slot 27 in the reveal of the window to permit this movement. In order to prevent this slot from looking unsightly, I provide a shield 28, which preferably is the curved outside of the case 12 which is shown in Figs. 8 and 22. This also keeps the slot 27 closed during all the various positions of the window, so as to prevent water, rain, dirt or other foreign matter from entering. It will be seen that by means of this arrangement the window section may have its bottom moved outwardly to any desired angular position, and while in this position the window may be moved about its up and down axis by means of the pivot 7 so that any desired angular position, not only front and rear, but up and down, may be attained. By means of this construction, it will be seen that the pivots 7 and 8 are concealed so as to be out of sight and so as not to interfere with the lines of the car or affect the outside appearance in any way.

The case 21 is preferably fixed in position in any desired manner. As herein shown, it is attached to a bracket 29 which is fastened to the window frame by suitable fastening devices 30. This bracket is preferably made very strong and extends along the window frame and preferably up to the front edge of the window section, preferably around to the upright portion of the window frame. This construction is shown, for example, in Fig. 11. This bracket also covers up the opening in the window frame into which the pivots are received and bridges the cut away portion so as to act as a substitute therefor and maintain the proper strength of the frame. This bracket may be of any desired form and may be fastened in position in any desired manner to secure the desired effect. I have illustrated it as having an inwardly projecting part 32, see Fig. 12, to which the case 21 is connected so that the case and its associated pivot may be placed inwardly a sufficient amount to be properly positioned with relation to the pivot 7. The entire bracket and the pivots are covered up by the garnish moulding 31, see Fig. 8. By means of this construction the expensive moulded sealing device can be done away with, due to the fact that the sealing device is required to be on only one side of the window section. This permits a cheap construction to be used, and for example permits the use of cheap rubber, such as extruded rubber.

I have shown one form of sealing device which consists of the sealing member 33 which is attached to the window frame at the front and the bottom and at the top, and if there is only one window section, it is also attached to the window frame at the rear. If there are two window sections, as shown in the front door in Fig. 1, then the sealing section 34 is attached to one of the window sections so as to seal the edge between them, this sealing section moving up when the window sections are moved up to horizontal position so as to leave an entirely full open window opening with an entirely fully closed awning at the top.

I have also illustrated this sealing device as being adjustable. For this purpose there is a member 35, preferably of metal, to which the sealing member 33 is connected. This member is properly attached to the window frame and bends around, as clearly shown in Fig. 15. This member 35 may be easily bent toward or from the window section so as to adjust the sealing member 33 to make proper contact with the window section. This adjustment is sometimes necessary, due to defective workmanship and to shrinking of the rubber by age or other reasons. In other words, to permit a proper adjustment of the sealing member so as to insure its being in proper contact with the window section when the window section is in its closed position.

In the particular construction shown, when the window section is in its closed position, it is fastened in its closed position by the locking device, which as herein shown consists of a rocking hub member 36 mounted upon a pin 37 attached to one edge of the window section, preferably the lower edge and which has the locking member 38 which engages a locking part 39 on the window frame. The hub 36 is provided with a handle 40 by means of which it can be locked to connect and disconnect the member 38 from the member 39. When the members 38 and 39 are connected together, the window is fixed in position so that it cannot be moved back and forth. When in this position, if the sealing member 33 does not engage it, then the member 35 can be bent to bring the sealing member into proper engagement with the window section.

In the particular construction herein illustrated, with the offset pivot the upper corner of the window near the pivot will pass into the window opening, due to its proximity to the pivot, in such a manner that at this point, for a short distance, the sealing member 33 is omitted and a sealing piece 42, see Fig. 8, is attached to the window reveal, and the top part of the window section, when closed, engages it, as shown in Fig. 8, squeezing it so as to secure a tight sealing joint, but being immediately relieved as soon as the window is slightly swung out from the bottom ready for adjustment.

It is of course evident that the front door, for example, may have a single window section, but I prefer to use two window sections, and when two window sections are used, some means is provided for sealing the space between them. I prefer to provide a sealing device for this purpose, which consists of the bent portion 35 which, as heretofore described, is attached to one of the window sections, in this case the section 3, and which has the sealing member 34 connected therewith and which overlaps the edge of the section 2. It will thus be seen that this member 35 may be bent to the proper position to insure the proper sealing contact between the sealing member 34 and the window section 2, but that this sealing member will be moved with the section 2 so that there can be a full open window when the two sections 2 and 3 are moved to a substantially horizontal position, as shown for example in Fig. 27, and when in this position the sealing device seals the space between the two sections 2 and 3 so that these two sections act as a shield in the event of rain, none of the water falling through the space between them. Furthermore, when the locking device is locked and the sealing member 33 properly adjusted, the locking of the locking member squeezes the window section against the sealing member so as to form a tight sealing joint.

Referring to the rear quarter window 5, there will be a single window section in this window and it will be substantially the same as the front section 2 just described, the difference being that if there are two sections in the front window, this rear quarter window will not have the sealing member attached to it, but the entire sealing member will be attached to the window frame. This permits the rear quarter section to be moved to any desired angular position to get any desired ventilating effect without having the window project into the automobile body so as not to be in a position to interfere in any way with the occupants, or so as to permit water, when it rains, from dropping into the automobile. It will also be noted that with this construction the window sections may be moved to their scooping position without making it necessary to have them project to too great an extent from the body, and they may also be used to scoop with their forward edges instead of reversing the window, as is the case with the windows now used, pivoted between their ends.

In Figure 10 I have shown the window section 2 in full lines with its rear end projecting outwardly so as to act as a wind deflector to draw air out of the body of the automobile, this drawing effect being accomplished by the current of air passing along the outer face of the section 2 as the car moves forward. In this Figure 10 I have also shown the section 2 in dotted lines in scooping position where the front end projects outwardly and the rear end inwardly, the current of air striking the inner face as the car moves forward so as to be directed into the automobile. I have also, from different views, shown these two positions in Figs. 20 and 21, the full line position being the deflecting position to withdraw air from the automobile, and the dotted line position being the scooping position to scoop air into the automobile. It will be seen that by means of this construction the window section is arranged so that when it is moved to an angular position, it then can be moved forward to vary the length of the opening in the front of the car extending lengthwise thereof, thus providing a construction where the window section can be moved to any angular position and at the same time the opening at the front of the section which opens into the car can be varied without changing the angular position of the section. Furthermore, it will be seen that with this device we have a window section pivoted upon an up and down axis and that the axis may be moved to different angular positions.

By means of this construction the window sections can be moved out of the way, as shown for example in dotted lines in Fig. 8, so as to leave a complete window opening with no obstructions in it, just the same as occurs where the sliding window is used and is slid down out of the way. Furthermore, by means of the double pivots it is not necessary to have the sealing device which engages the face of the window section with a portion on one side of the window and another portion on the other side of the window, due to the pivotal movement of the window about its upright axis, but this sealing device can be all on one side of the window, and then by moving the window a short distance longitudinally of the car and moving one edge out from the car, the window can be moved so that one end will enter the automobile and the other end project outwardly, without striking the sealing device and without the sealing device interfering with or preventing this movement.

I claim:

1. An air deflecting device for automobiles having closed bodies and having a window opening surrounded by a window frame, comprising an air deflecting section extending in a vertical direction, when in its closed position, from the top to the bottom of the window opening pivotally supported in position in the window opening between its front and rear edges and nearer its front edge than its rear edge so as to be moved about a movable up and down axis intermediate its front and rear edges, said axis movable to various angular positions by pressure applied to said deflecting section.

2. An air deflecting device for automobiles having closed bodies and having a window opening surrounded by a window frame, comprising an air deflecting section extending in a vertical direction, when in its closed position, from the top to the bottom of the window opening supported at its top in the forward portion of the window opening by a compound pivotal connection, whereby the bottom of the air deflecting section may be moved outwardly and the air deflecting section may, when in this position, be moved to various angular air deflecting positions.

3. An air deflecting device for automobiles having closed bodies and having a window opening surrounded by a window frame, comprising a window section extending in a vertical direction, when in its closed position, from the top to the bottom of the window opening pivotally connected at its top with the window frame located in the forward portion of the window opening and within the reveals of the closed car body by two pivots at an angle to each other, said window section when in its closed position in the window opening forming the window of the automobile, said window section adapted to be moved to different angular positions both in a horizontal and vertical direction.

4. An air deflecting device for automobiles having closed bodies and having a window opening surrounded by a window frame, comprising a window section extending in a vertical direction, when in its closed position, from the top to the bottom of the window opening pivotally connected at its top with the window frame by a compound pivot concealed within the upper part of the window frame and having a connecting member connected with the window section, a slot through which said connecting member passes, and a movable shield in said slot, the bottom being disconnected from the window frame and free to be moved outwardly away from the window frame.

5. An air deflecting device for automobiles having closed bodies and having a window opening surrounded by a window frame, comprising a window section extending in a vertical direction, when in its closed position, from the top to the bottom of the window opening pivotally connected at its top with the window frame, the bottom being disconnected from the window frame and free to be moved outwardly away from the window frame and when in its closed position engaging the lower portion of the window frame, and means associated with the connection of the window section to the window frame for permitting the window section to be moved to an angular position when the bottom is moved out away from the window frame.

6. An air deflecting device for automobiles having closed bodies and having a window opening surrounded by a window frame, comprising a window section extending in a vertical direction, when in its closed position, from the top to the bottom of the window opening pivotally connected in position in the window opening on an up and down axis, by a pivotal connection concealed within the upper portion of the window frame said axis being movable to various angular positions.

7. An air deflecting device for automobiles having closed bodies and having a window opening surrounded by a window frame, comprising two window sections pivotally connected in the window opening on up and down axes, said axes being movable to various angular positions, and means for preventing the two window sections from striking together when said up and down axes are moved to various angular positions.

8. An air deflecting device for automobiles having closed bodies and having a window opening surrounded by a window frame, comprising two window sections extending in a vertical direction, when in their closed position, from the top to the bottom of the window opening pivotally connected at one edge thereof with the window frame by two pivots at an angle to each other, said window sections when in their closed positions forming the window of the automobile, said window sections adapted to be moved to different angular positions both in a horizontal and a vertical direction the front section being movable independent of the rear section.

9. An air deflecting device for automobiles having closed bodies and having a window opening surrounded by a window frame, comprising two window sections extending in a vertical direction, when in their closed position, from the top to the bottom of the window opening pivotally connected at one edge thereof with the window frame by two pivots at an angle to each other, said window sections when in their closed positions forming the window of the automobile, said window sections adapted to be moved to different angular positions both in a horizontal and a vertical direction the front section being movable independent of the rear section, a sealing device for sealing the space between the adjacent edges of the section when they are in their closed positions.

10. An air deflecting device for automobiles having closed bodies and having a window opening surrounded by a window frame, comprising two window sections extending in a vertical direction, when in their closed position, from the top to the bottom of the window opening, each pivotally connected at its top with the window frame by two pivots at an angle to each other, said window sections when in their closed positions in the window opening forming the window of the automobile, said window sections adapted to be separately moved to different angular positions and to have their bottoms moved outwardly so that they form a canopy for the window opening.

11. An air deflecting device for automoblies having closed bodies and having a window opening surrounded by a window frame, comprising two window sections extending in a vertical direction, when in their closed position, from the top to the bottom of the window opening, each pivotally connected at its top with the window frame by two pivots at an angle to each other, said window sections when in their closed positions in the window opening forming the window of the automobile, said window sections adapted to be separately moved to different angular positions and to have their bottoms moved outwardly so that they form a canopy for the window opening, and a sealing device for sealing the space between the adjacent edges of said window sections, both when they are in their closed positions and when they are in position to form a canopy for the window opening.

12. An air deflecting device for automobiles having a window opening, comprising a window section extending in a vertical direction, when in its closed position, from the top to the bottom of the window opening mounted at one edge in position in the window opening between the reveals, the opposite edge being free, means for moving the free edge in a direction away from the window opening and for moving said window section to various angular positions while the free edge is in a position away from the window opening.

13. An air deflecting device for automobiles having a window opening, comprising a window section extending in a vertical direction, when in its closed position, from the top to the bottom of the window opening mounted at one edge in position in the window opening between the reveals, the opposite edge being free, means for moving the free edge in a direction away from the window opening and for moving said window section to various angular positions while the free edge is in a position away from the window opening, and means for holding said window in any of its various positions.

14. An air deflecting device for automobiles having closed bodies and having a window opening surrounded by a window frame, comprising two window sections extending in a vertical direction, when in their closed position, from the top to the bottom of the window opening, pivotally connected at one edge thereof with the window frame by two pivots at an angle to each other, said window sections when in their closed positions forming the window of the automobile, said window sections adapted to be moved to different angular positions both in a horizontal and a vertical direction, the front section being movable independent of the rear section, sealing devices for engaging the faces of said window sections when closed, so as to form a sealed closure, all of the parts of said sealing devices being on the same side of the window sections.

WILLARD L. MORRISON.